June 23, 1959 H. W. WESTEREN 2,891,659
CONVEYOR SYSTEM AND RETRACTABLE LATCH THEREFOR
Filed May 23, 1957 3 Sheets-Sheet 1
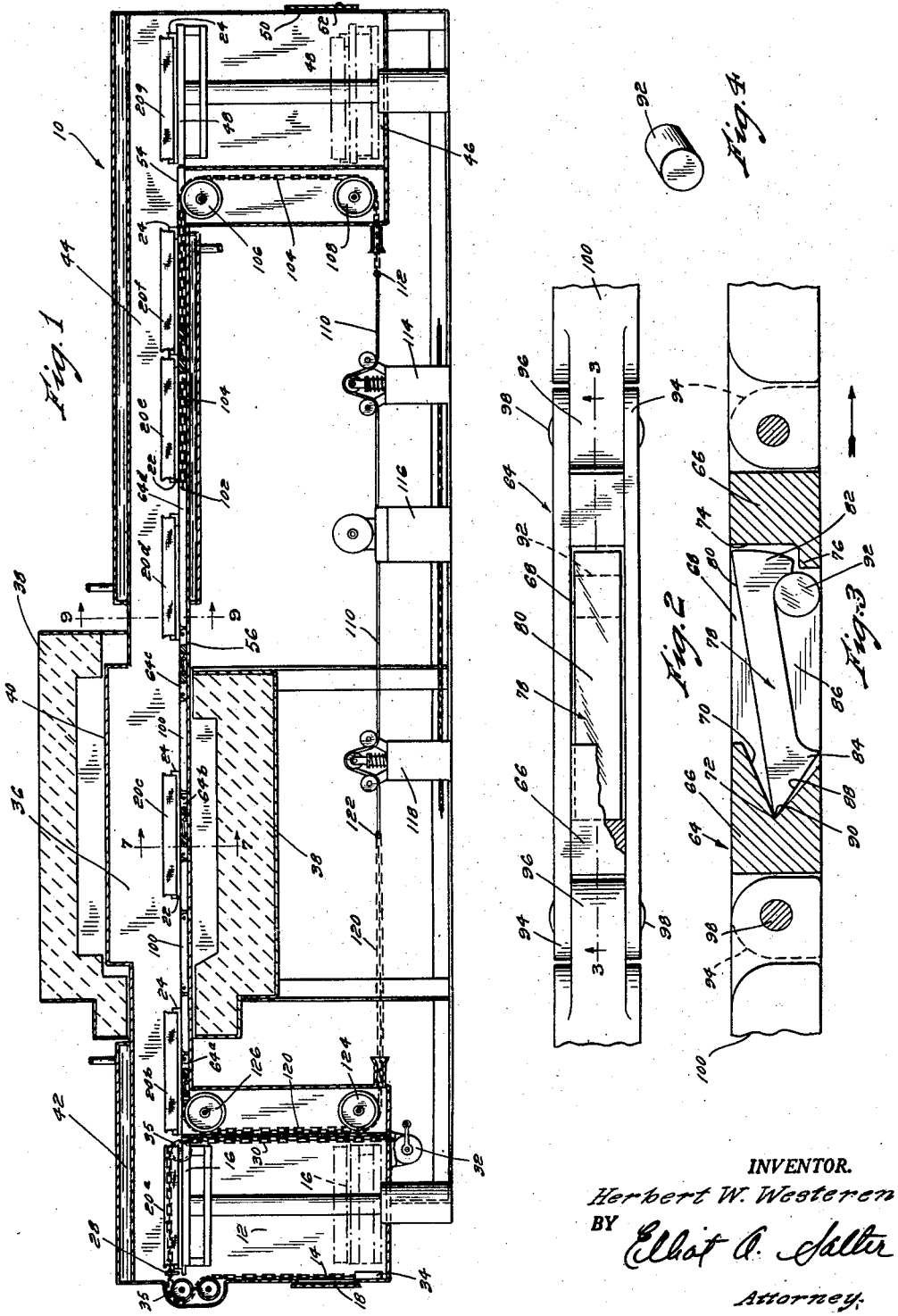
INVENTOR.
Herbert W. Westeren
BY Elliot A. Salter
Attorney.

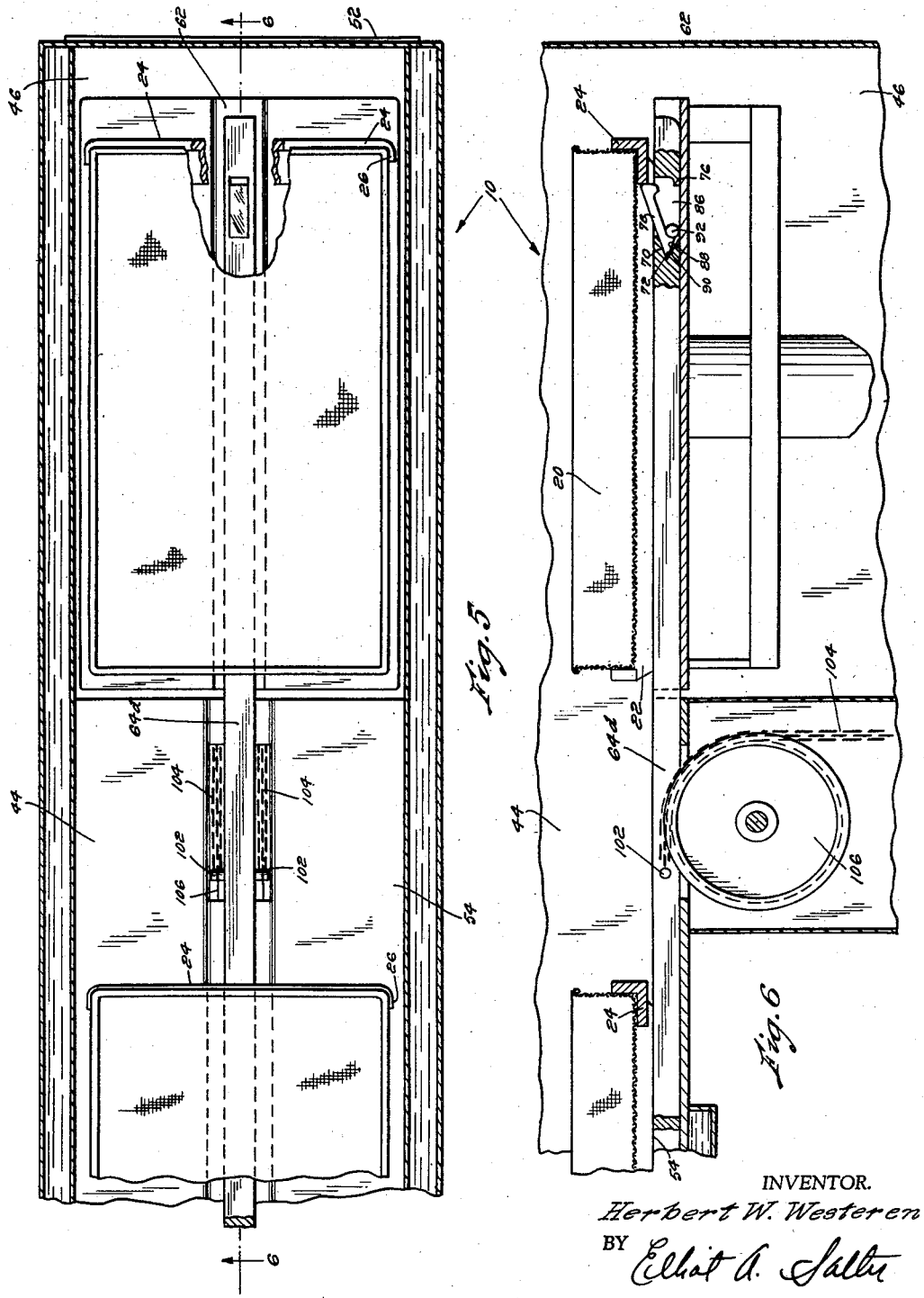

June 23, 1959    H. W. WESTEREN    2,891,659
CONVEYOR SYSTEM AND RETRACTABLE LATCH THEREFOR
Filed May 23, 1957    3 Sheets-Sheet 3

INVENTOR.
Herbert W. Westeren
BY Elliot A. Salter
Attorney

United States Patent Office 2,891,659
Patented June 23, 1959

2,891,659
CONVEYOR SYSTEM AND RETRACTABLE LATCH THEREFOR

Herbert W. Westeren, Barrington, R.I., assignor to C. I. Hayes, Inc., a corporation of Rhode Island Application May 23, 1957, Serial No. 661,164

5 Claims. (Cl. 198—221)

The present invention relates generally to a novel and improved conveyor system for moving parts or containers through a treatment area, such as a heat treatment furnace.

A primary object of the instant invention is the provision of a conveyor system particularly adaptable to heat treatment furnaces, but not limited thereto, wherein a reciprocal conveyor stroke is employed.

Another important object of this invention is the provision of a conveyor system designed to simultaneously move a plurality of parts or containers through a treatment area, the conveyor apparatus being so constructed and arranged as to automatically effect variable travel of the different parts or containers even through a constant reciprocal conveyor stroke is utilized.

Another object of my invention is the provision of a conveyor system for simultaneously moving a plurality of parts or containers wherein a minimum of starting torque is required by the conveyor system.

A further object of the instant invention is the provision of a conveyor system which when used in connection with heat treatment furnaces enables a high degree of control to be exercised over the movement of the work therethrough.

An additional object of my invention is the provision of a conveyor system which when utilized in connection with a heat treatment furnace enables a controlled atmosphere to be utilized therein without any appreciable danger of contamination.

Another object of the present invention is the provision of a conveyor system effective for moving parts or containers through an enclosed treatment area, either automatically or semi-automatically, and without the necessity of entering the enclosed area other than for loading and unloading purposes.

Still another object of my invention is the provision of a novel and improved retractable latch mechanism which is simple but yet highly effective in operation and which is capable of moving even extremely heavy work loads.

Still another object is the provision of a conveyor system which is versatile, effective and economical in operation, of rugged and durable construction, and capable of functioning at relatively high heat treatment temperatures.

Other objects, features and advantages of the invention will become apparent as the description thereof proceeds when considered in connection with the accompanying illustrative drawings.

In the drawings which illustrate the best mode presently contemplated by me for carrying out my invention:

Fig. 1 is a front elevation, partly in section, of a heat treatment furnace utilizing therein my inventive conveyor system;

Fig. 2 is a fragmentary plan view of the retractable latch which forms a part of my invention, on an enlarged scale and partly broken away for purposes of illustration;

Fig. 3 is a section taken on line 3—3 of Fig. 2;

Fig. 4 is a perspective detail, on an enlarged scale, of the actuating roll which forms a part of the retractable latch;

Fig. 5 is a fragmentary plan view, on an enlarged scale and partly broken away, showing the unloading end of the furnace;

Fig. 6 is a section taken on line 6—6 of Fig. 5;

Figure 7:
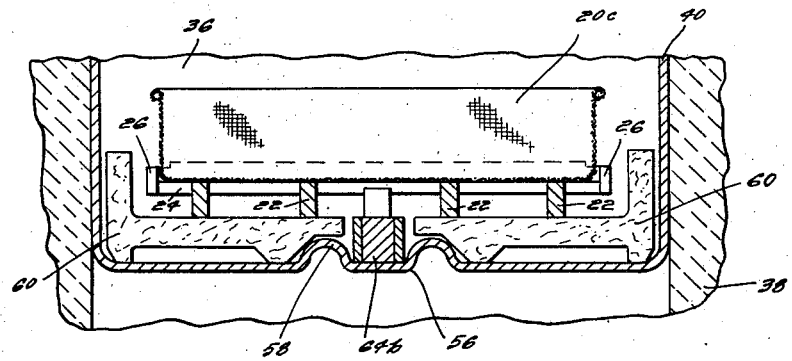
Fig. 7 is a section, on an enlarged scale, taken on line 7—7 of Fig. 1.

It has been found desirable to provide a novel and improved conveyor system for simultaneously moving a plurality of parts or trays through an enclosed treatment area. Thus, there has been developed in accordance with the instant invention a conveyor system and apparatus wherein a reciprocal conveyor stroke is utilized to simultaneously impart variable distance movements to the different parts or containers. An important feature of this improved conveyor apparatus is the retractable latch members which are utilized, said members being rugged and highly efficient in use in spite of their extreme simplicity.

While the instant invention has a wide range of utility, it has proven to be of particular value in connection with high temperature muffle furnaces wherein a controlled hydrogen atmosphere is utilized for heat treatment purposes. In treatment furnaces of this type, it is the practice to successively feed a plurality of work loads therethrough, and properly controlled movement of said work loads has long been a problem. Thus, when the work is successively fed or moved from the furnace loading station to the heat treatment chamber, it is in many instances desirable to maintain a predetermined spaced relation between successive loads in order to insure that only one load will be in the heating chamber at any one time and that it will be substantially centrally positioned therein. Furthermore, this spaced relation between adjacent loads enables the heat treated work to move quickly from the heating chamber to the cooling chamber, this rapid movement being a necessary in certain types of heat treatment operations. This proper positioning of the work load one at a time within the heating chamber and the quick removal therefrom to the cooling chamber greatly increases the uniformity of heat treatment on the work, a factor which has proven to be of vital importance in the accomplishment of successful heat treatment. On the other hand, once the work has passed from the heating chamber to the cooling chamber, there is no need of maintaining this spaced relationship between adjacent loads, and, in fact, it is desirable to increase the output capacity of the furnace by having as many work loads in the cooling chamber at one time as possible.

At the present time, numerous methods of conveyance are used for moving work loads through heart treatment furnaces, perhaps the most common being a straight chain-belt conveyor and manually operated pokers or push rods. Where the chain-belt method is used, the work may be spaced at any desired intervals, but obviously, the same intervals will be maintained throughout the furnace, and hence, maximum utilization of the cooling chamber will not be achieved whereby the output capacity of the furnace is lessened. Also, since movement of the belt will be intermittent, each time it starts up it must generate a tremendous starting torque to overcome the friction and static inertia of all of the work loads spaced along the chain. Quite obviously, this will create excessively large stresses in the conveyor thereby rendering it susceptible to breakage, particularly that portion of the conveyor within the heating chamber. In some instances, conveyor chains are utilized wherein the work loads push each other through the furnace in tandem relationship. This has proven to be undesirable in that uniform heating of the work is not as successfully accomplished since the loads move very slowly from the heating chamber to the cooling chamber, and during the course of their travel, stop at points where they are half in and half out of the heat treatment area. In addition, the chain is subjected to the same extensive stresses mentioned supra, and it has also been found that on occasion there is a tendency for one of the heated work containers to buckle as it pushes along a plurality of cooled containers. Where a manually operated push rod or poker is used for moving the work through the furnace, it has been found that a certain amount of seepage of contaminating atmosphere takes place at the point where the rod extends through the furnace housing. In addition, this method constantly requires the presence of an operator, and even then it is difficult to maintain precise control of the successive work loads.

In order to overcome these numerous disadvantages, there is provided in accordance with the instant invention a conveyor operating on a reciprocal stroke and comprising a plurality of retractable latch members. As will hereinafter become apparent, the latch members are so constructed so that when the conveyor moves forwardly, said latches automatically raise to operative position. Conversely, when the conveyor reverses its direction and moves backwardly, the latches automatically lower to inoperative position. By utilizing a predetermined conveyor stroke, and by properly positioning the latch members, it is possible to simultaneously obtain a variable movement of the different work loads whereby, as the loads pass through the heating chamber, they are properly spaced, but upon reaching the cooling chamber, they assume a tandem relationship. Also, the stresses on the conveyor are greatly minimized due to the fact that all of the work loads do not commence movement at any one time.

Referring now to the drawings, and more particularly to Fig. 1 thereof, there is shown generally at 10 a high-temperature muffle furnace of the type generally utilized in connection with the heat treatment of stainless steels and the like. The furnace 10 is generally operated with a controlled hydrogen bearing atmosphere which envelops the work and prevents contamination thereof due to surface oxidation and the like which otherwise would occur at the relatively high heat treatment temperatures. The work to be heat treated is introduced to loading chamber 12, and, more specifically, a plurality of work trays carrying the work are successively introduced to said chamber through entrance opening 14 whereupon they are received by elevator platform 16 when the latter is in its lowermost position (as shown in dotted lines in Fig. 1). As will be noted, entrance opening 14, which is provided with any suitable cover 18, is located adjacent the lower extremity of the chamber 12 so that any contaminating atmosphere which seeps into the furnace during the loading operation will have no tendency to come in contact with the heating chamber due to the fact that the relatively light hydrogen atmosphere will completely fill the upper portion of the furnace 10, while the heavier air will tend to remain near the bottom of the loading and unloading chambers.

As will be seen most clearly in Figs. 1, 6 and 7, the work trays 20 comprise mesh baskets of substantially rectangular configuration, each having a plurality of longitudinally extending skid rails 22 secured to the bottom thereof for minimizing friction between the tray bottoms and the furnace floor as the former move along the latter and also to keep the trays in spaced relation from the furnace floor so as to minimize floor warpage and promote uniform heating of the work. In addition to the longitudinally extending skid rails 22, each tray 20 is provided along its front lower edge with a transversely extending bumper-like rail 24 which depends below the tray bottom. As will be noted, the bumper rails 24 extend around the front corners of each of the trays for a short distance as at 26 whereby to prevent the tray proper from coming in direct contact with the side walls of the furnace as the trays move therethrough. Although it will be understood that the plurality of trays 20 are all of identical construction, for purposes of illustration they are referred to in Fig. 1, from front to rear, as 20a to 20g, respectively.

After a work tray has been inserted through entrance opening 14 onto the lowered elevator 16, the elevator is raised upwardly to its full-line position of Fig. 1, at which point an elevator unloader 28 is effective to move or push the tray from the elevator platform to the position occupied by tray 20b, at which position the conveying mechanism hereinafter to be described will move the tray longitudinally through the furnace. The unloader 28 may be of any desired form although I prefer to utilize a reciprocating sweep bar, which may be actuated by chain cables 30 and drum 32, it being understood that the cables 30 straddle the opening 14 and have at their lower ends counterweights 34 for maintaining themselves taut over the various idler pulleys 35. As will be obvious, operation of the drum 32 will cause the unloader 28 to sweep across elevator platform 16, thereby pushing the tray disposed thereon to the position occupied by tray 20b in Fig. 1, as hereinbefore indicated.

Figure 8:
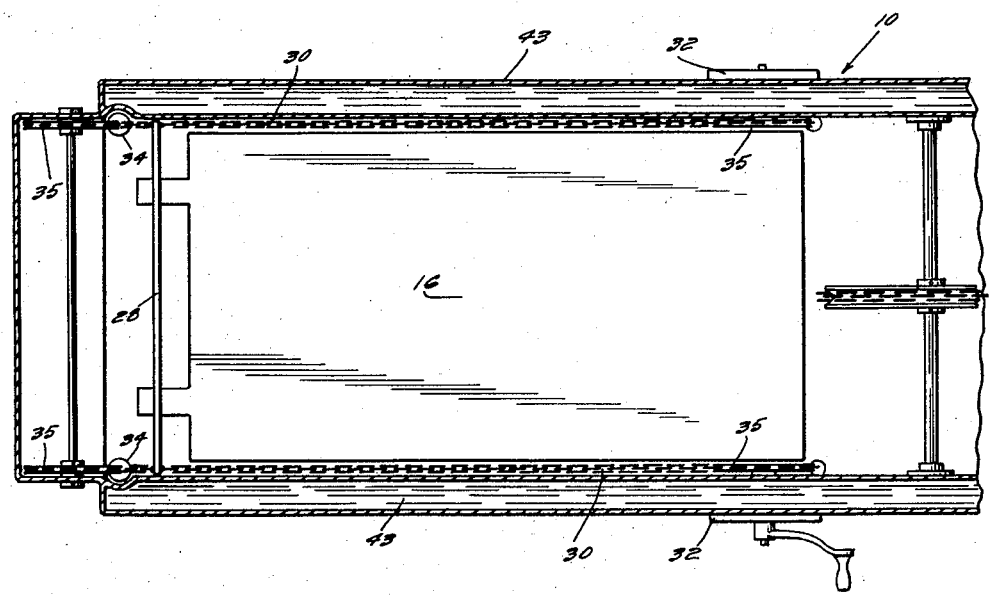
Fig. 8 is a fragmentary plan view, on an enlarged scale, showing the loading end of the furnace.

The furnace 10 is provided with the usual heating chamber 36 consisting of refractory material 38 and muffle lining 40. In order to prevent excessive rearward drifting of the hydrogen atmosphere from the heating chamber 36, the portion of the furnace leading up to said heating chamber is preferably water cooled at its upper surface as at 42 and also along its side walls as at 43 (Fig. 8). Cooling section 44 is likewise water cooled, although on all four sides, as shown most clearly in Fig. 9. Adjacent the cooling section 44 and at the rearmost end of the furnace there is provided an unloading chamber 46 having an elevator 48, exit opening 50, and closure 52. As will be apparent, when the elevator 48 is in its upper position, it may receive the work trays from the cooling section, whereupon the elevator is lowered to the dotted-line position of Fig. 1, at which point the work tray is removed through exit opening 50. Here again, it is important to note that the exit opening is at a relatively low level whereupon any inward seepage of contaminating atmosphere that takes place at this point will have no adverse effect on the hydrogen atmosphere of the furnace proper.

As will be noted, the furnace floor 54 extends intermediate the loading and unloading chambers and is provided with a longitudinally extending, centrally disposed trough 56. Although the trough 56 extends continuously for the length of the floor 54, it nevertheless is of two different constructions. More specifically, up to and through the heating chamber 36 the trough is defined by a pair of spaced, longitudinally extending corrugations 58 as shown most clearly in Fig. 7. This particular construction strengthens the floor 54 and renders it less susceptible to warpage at the points where strength is most needed and warpage is most likely to occur, namely, within the heating chamber. It has been found that where the trough is formed by welding angle strips or the like to the furnace floor, warpage is promoted, and hence, the integral corrugated construction disclosed and described has been found to be most desirable. At the same time, the corrugations 58 serve to maintain the segmented super hearth sections 60 in spaced relation so that they will not inadvertently extend over the trough. The super hearth sections 60 overlie the furnace floor up to and through the heating chamber in order to eliminate contact between the work load and the muffle walls, hence lessening the tendency of a sudden and rapid heat transfer taking place upon introduction of the cold work into the heating chamber, it being obvious that such a rapid heat transfer would tend to promote warpage of the muffle walls. Beginning with the cooling section 44, however, trough 56 is nothing more than a depression in the floor as shown most clearly in Fig. 9. Also, for reasons hereinafter to become apparent, unloading elevator 48 is provided with a trough 62 which is in alignment with trough 56 as will be seen most clearly in Figs. 1, 5 and 6.

The conveyor system for moving the work trays 20 through the furnace comprises a plurality of pivotally connected link members generally designated at 64, adapted to be moved through the trough 56. Each of the link members 64 is provided with a body portion 66 having an opening 68 therein, the rear wall 70 of said opening converging to a point as at 72 and the front wall 74 having an inturned lip at its lower edge as at 76. An elongated latch member 78 is freely positioned within the opening 68, said latch member having a substantially flat top 80 and downwardly depending front and rear portions 82 and 84, respectively, defining an elongated space 86 therebetween. As will be seen most clearly in Fig. 3, the rear wall 88 of latch member 78 converges with top wall 80 to provide a rear edge 90 which seats within the convergent rear wall 70 of the opening 68. Thus, when an actuating roll 92 is placed under latch member 78 within the space 86, movement of the entire link member 64 over a fixed surface, and in the direction of the arrow in Fig. 3, will result in upward pivoting of the latch 78 until the upper surface thereof engages the upper portion of convergent wall 70 as clearly shown in Fig. 6. More specifically, upon forward movement of the links 64, the actuating roll 92 will be caused to rotate rearwardly relative to latch member 78 whereby to force it upwardly into operative tray engaging position. Conversely, rearward movement of links 64 (in a direction opposite to that of the arrow in Fig. 3) will cause the roll 92 to return to the position of Fig. 3 wherein the latch is retracted or inoperative. Thus, movement of the link members in one direction automatically raises the latches to operative position, whereas reverse movement automatically retracts the latches.

The link members 64 are constructed of any heat-resistant alloy and are pivotally joined to each other at their extremities by any desirable means. I prefer to effect this pivotal joint by providing every other link with spaced pivot ears 94 at the link ends and then constructing the adjacent alternate links with reduced end extensions 96 adapted to fit snugly but freely between the ears 94 as most clearly shown in Fig. 2. A pivot pin 98 then pivotally interconnects the adjacent links by extending through their respective pivot ears and reduced extension portions.

As hereinbefore indicated, the links 64 are constructed of heat resistant alloy and may even be constructed of refractory material where the temperatures to which they are to be exposed necessitate same. Also, while it is desirable to make the individual links as long as possible, it has been found that the links which are exposed to the heating chamber must be articulated to prevent warpage, and hence, as will be noted in Fig. 1, a total of eight links are provided, the first seven of which are relatively short, while the eighth, which is in the cooling chamber, is of considerable length. Still referring to Fig. 1, it will be noted that certain of the link members contain no latch mechanism whatsoever, but rather function merely as interconnecting links to provide a continuous chain. In order to more clearly illustrate the link construction and to aid in the description thereof, the four link members which comprise latch mechanism have been numbered in Fig. 1 as 64a, 64b, 64c, and 64d, while the plain links have each been numbered 100. Link 64d, which, as afore indicated, is a relatively long link, is provided with a pair of outwardly extending pins 102 (Fig. 5) which function as securing means for a pair of elongated chains 104. The chains 104 straddle the forwardmost portion of link 64d and then extend over idlers 106 and 108, after which they are secured to cable 110 as at 112. Cable 110 extends over circuit breaker 114 and then proceeds to power means 116, the latter means functioning to impart movement to the conveyor assembly. While the power means 116 could comprise hydraulic or air cylinders, I prefer to utilize an electric winch. Cable 110 continues from winch 116 over a second circuit breaker 118 and then connects with a second chain 120 as at 122. As will be noted, chain 120 extends over idlers 124 and 126 and then connects to the outermost extremity of link 64a whereby a complete loop system is provided. The chains 104 and 120 are preferably of the open-link type to facilitate purging.

Figure 9:
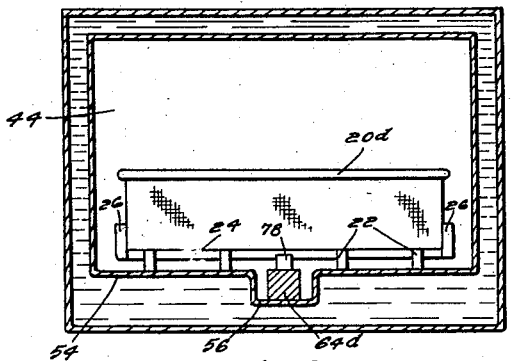
Fig. 9 is a section, on an enlarged scale, taken on line 9—9 of Fig. 1.

It will be understood that the latch containing link members 64a, 64b, 64c, and 64d, as well as the plain links 100, are positioned within the trough 56 and are of slightly less height than the depth of said trough. At the same time, the work trays 20 overlie the trough 56 and are spaced somewhat thereabove due to the longitudinal skid rails 22 which cooperate with the segmented super hearth members 60 to maintain the work trays elevated in the heating chamber (note Fig. 7), and which longitudinal skid rails also maintain the work trays elevated in the cooling section as illustrated in Fig. 9. Thus, when the electric winch 116 is operated to move the link members in a forward direction, the afore described action of latch members 78 will become effective to raise said latches to operative position whereupon they will engage the depending bumper-like rail 24 of each work tray to move the work tray for a certain distance, said distance depending upon the length of stroke of the mechanism and also upon the initial positioning of the tray. When winch 116 reverses its stroke, the latches 78 will automatically retract, whereupon they will slide harmlessly beneath the trays until the initial position of the assembly is once again reached.

When operating the instant furnace and conveyor mechanism, a work tray 20 is inserted through opening 14 onto loading elevator 16, after which the door 18 is closed, the chamber 12 purged, and then the elevator raised to bring the work tray to the position of tray 20a in Fig. 1. The elevator unloader 28 is then operated to move the tray to the position occupied by tray 20b. The winch 116 is then operated, whereupon the latch of link 64a engages the depending rail 24 of the tray and carries it to the position of tray 20c. In the meantime, another tray has been inserted and has been moved to the position of tray 20b in the manner afore described. When the conveyor mechanism is once again actuated, the latch of link 64b moves tray 20c to the position of tray 20d, and at the same time, the positions 20b and 20c are again being filled. The next actuation of the conveyor means causes link latch 64c to move tray 20d to the position of tray 20e, and upon movement of the next succeeding tray to the position 20e, the tray formerly in that position is pushed by the said next succeeding tray to the position 20f. The tray 20f then completes its movement through the furnace by being moved to the position 20g by the latch of link member 64d. As will be noted, when the tray reaches the position 20g, it is positioned on the unloading elevator 48, this having been made possible by the fact that said elevator platform is provided with a trough 62 which is a continuation of the trough 56. Thus, the elonagted link 64d makes engagement with the tray 20f and moves it straight across onto the unloading elevator platform, it being noted that in order to accomplish this movement the connecting pins 102 must be spaced from idlers 106 a distance greater than the stroke of the conveyor. This enables the chain 104 to extend over and down from idlers 106 while at the same time pulling the link 64d in a straight-line path over the top of said idlers to the position shown in Fig. 5. At this point, the elevator 48 is lowered, and the tray 20g is removed from the furnace. Once the furnace is operating and full as shown in Fig. 1, each tray will successively move through the furnace in the manner afore indicated. Thus, it will be seen that by the particular spacing of the latch members, the work trays are conveyed singly through the heating chamber, but then said trays catch up with each other in the cooling section where such spacing between trays is no longer necessary or desirable. As will be seen, by rearranging the positions of the latches, it is possible to obtain a variety of tray movements even though the actuating stroke be the same. Should there be a jam-up anywhere in the furnace, either during forward or reverse movement of the conveyor, the increased tension of cable 110 will actuate one of the circuit breakers 114 or 118 to shut off the motor at winch 116.

Due to the particular spacing of the latch members, it will be noted that the trays are not all engaged at the same time, and hence, the conveyor does not require the excessive starting torque which would be necessary where initial movement of all of the work trays is simultaneous. Furthermore, it has been found that the retractable latch arrangement which forms an important part of this invention is exceedingly rugged and effective, and in spite of its extreme simplicity of construction, is easily capable of moving heavy work loads of the type normally found in heat treatment batches.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except in so far as indicated by the scope of the appended claims.

I claim:

1. Retractable latch mechanism comprising a link member having an elongated body portion, means for imparting longitudinal reciprocable movement to said link member over a fixed supporting surface, an elongated opening extending longitudinally of said link member and passing completely therethrough from top to bottom, a latch element positioned within said opening for pivotal movement between a retracted position wherein it lies substantially within said link and an operative position wherein it extends upwardly above said link, and an independent, disconnected actuating element freely positioned between and in engagement with the underside of said latch element and said fixed supporting surface, whereby movement of said link member in one direction automatically causes relative movement of said actuating element toward said latch element pivot point to move said latch to operative position, while reverse movement of said link automatically causes reverse relative movement of said actuating element to return said latch to retracted position.

2. The retractable latch mechanism of claim 1 further characterized in that said actuating element comprises a cylindrical roller.

3. The retractable latch mechanism of claim 2 further characterized in that said latch element is provided with downwardly depending portions adjacent each of its extremities, said depending portions defining a trackway for movement of said roller.

4. Retractable latch mechanism comprising a link member having an elongated body portion, means for imparting longitudinal reciprocable movement to said link member over a fixed supporting surface, an elongated opening extending longitudinally of said link member and passing completely therethrough from top to bottom, a latch element positioned within said opening for pivotal movement between a retracted position wherein it lies substantially within said link and an operative position wherein it extends upwardly above said link, the bottom surface of said latch and said fixed supporting surface defining therebetween a wedge-shaped space, the narrow end of which is adjacent the latch pivot point, and an actuating roller positioned in said space, said roller being relatively movable toward and away from the latch pivot point responsive to reciprocable movement of said link, and the diameter of said roller being such that said latch is forced upwardly as the roller approaches the latch pivot point and, conversely, is free to pivot downwardly when the roller moves away therefrom.

5. The retractable latch mechanism of claim 4 further characterized in that said latch element is freely positioned within said opening, said latch having a pointed end edge portion, and one of the end walls defining said opening having a convergent configuration for receiving said latch pointed edge whereby to effect the pivoted mounting of said latch.

References Cited in the file of this patent

UNITED STATES PATENTS

| | | |
|---|---|---|
| 776,330 | Johnson | Nov. 29, 1904 |
| 1,446,594 | Sadler | Feb. 27, 1923 |
| 1,736,935 | Navarre | Nov. 26, 1929 |
| 1,957,638 | Gibbs | May 8, 1934 |
| 2,189,983 | Harris | Feb. 13, 1940 |

FOREIGN PATENTS

| | | |
|---|---|---|
| 537,201 | France | May 18, 1922 |